(No Model.)
R. & J. FALKENRATH.
WHIP SOCKET.
No. 493,579.   Patented Mar. 14, 1893.
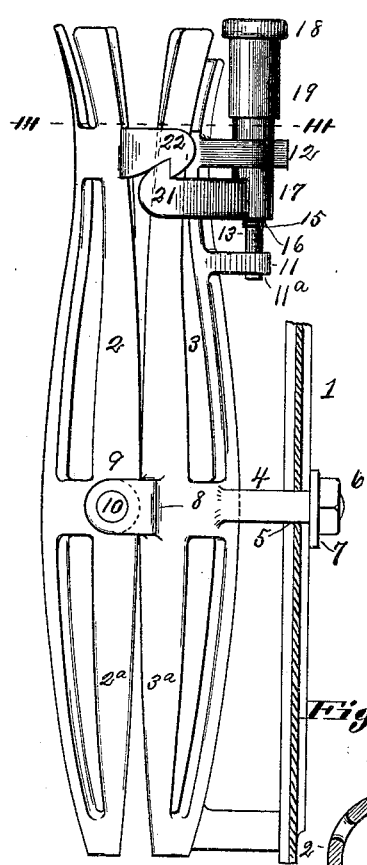
Fig. I.
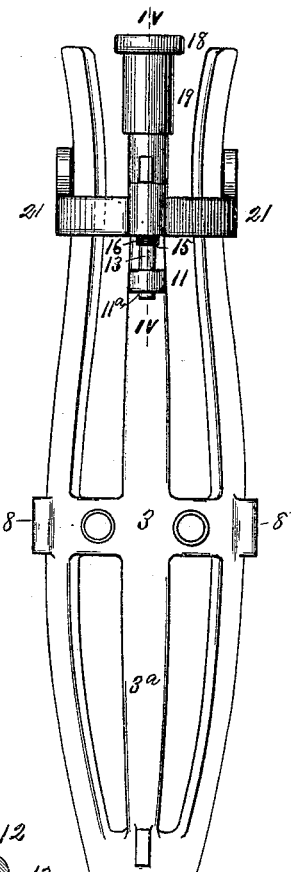
Fig. II.
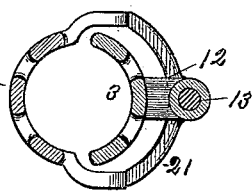
Fig. III.
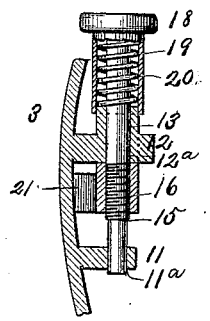
Fig. IV.
Attest:
Albert M. Ebersol
E. S. Knight
Inventors:
Rudolph Falkenrath
Julius Falkenrath
By Knight Bros.
Att'ys

UNITED STATES PATENT OFFICE.

RUDOLPH FALKENRATH AND JULIUS FALKENRATH, OF ST. LOUIS, MISSOURI.

WHIP-SOCKET.

SPECIFICATION forming part of Letters Patent No. 493,579, dated March 14, 1893.

Application filed July 26, 1892. Serial No. 441,318. (No model.)

*To all whom it may concern:*

Be it known that we, RUDOLPH FALKENRATH and JULIUS FALKENRATH, both of the city of St. Louis, in the State of Missouri, have invented a certain new and useful Improvement in Self-Latching Whip-Sockets, of which the following is a full, clear, and exact description, reference being had to the accompanying drawings, forming part of this specification.

Our improvement relates to that class of inventions which has for its object the production of an adjustable whip socket, which will firmly retain the whip when closed, and from which, when opened, the whip may be readily removed.

Figure I is a side elevation of our improved whip socket, shown attached to a dash-board. Fig. II is an elevation, illustrating the socket. Fig. III is a transverse section taken on line III—III, Fig. I. Fig. IV is a detail, vertical section, taken on line IV—IV, Fig. II.

Referring to the drawings:—1 represents the dash-board of a vehicle, and 2 and 3 two parts of the whip socket. On the section 3 are bolts 4 that pass through openings 5 in the dash-board, and are secured by nuts 6, said nuts having bearing against washers 7. The two parts 2 and 3 are connected by means of a pivot formed of lugs 8, on the part 3, openings 9 in the lugs engaging circular projections 10 on the part 2 to form the pivot. On the part 3 are lugs 11 and 12 in which a pin 13 works through openings $11^a$ and $12^a$, in the respective lugs 11 and 12. The lower end of the pin 13 which works through the opening $11^a$ is reduced and a shoulder 15 is formed upward from which shoulder on the pin a thread 16 is formed that engages with a corresponding internal threaded sleeve 17.

18 represents a thumb piece open on its under side to form a telescoping tube 19 within which fits a spiral spring 20, that returns the pin 13 to its normal position after its depression. The sleeve 17 has projecting arms 21 made in the form of hooks to engage with hooks 22 on the part 2.

The operation of our locking socket is as follows:—When the socket is in closed position, as shown in Fig. I, the thumb piece 18 being depressed will depress the pin 13, and with the pin the arms 21 on the sleeve 17, thus releasing the hooks on the part 3 from the hooks on the part 2 and allowing the whip to be removed. All that is necessary to secure the socket on the whip is to insert the whip, when the socket is open, and the butt of the whip coming in contact with the interior lower ends $2^a$ and $3^a$ of the socket will cause the lower end $2^a$ of the part 2 to move outward while the upper end of the part 2, will move inward and cause the hooks on part 2 to engage with the hooks on part 3, thus locking the socket so that the whip may not be jerked from the socket without first depressing the pin 13.

We have shown the stationary hooks on the movable part 2, and the movable hooks on the stationary part 3. We do not confine ourselves to this arrangement of the parts as it is quite evident that the parts would operate and be quite as satisfactory if the position of the stationary and movable catches were reversed.

We claim as our invention—

1. In a whip socket made in two sections hinged together, a stationary hook on one section of the socket, a movable pin working in bearings on the other section of the socket, and a hook on said pin for engaging the stationary hook; substantially as and for the purpose set forth.

2. In a whip socket, made in two sections hinged together, stationary hooks on one of the sections, a spring actuated pin on the other section, and hooks on said pin which are formed to engage said stationary hooks, substantially as and for the purpose set forth.

RUDOLPH FALKENRATH.
JULIUS FALKENRATH.

In presence of—
ALBERT M. EBERSOLE,
EDWARD S. KNIGHT.